United States Patent

[11] 3,547,083

| [72] | Inventor | Reuben Peterson |
| | | Wessington Springs, S. Dak. 57382 |
| [21] | Appl. No. | 814,237 |
| [22] | Filed | April 8, 1969 |
| [45] | Patented | Dec. 15, 1970 |

[54] SELF-WATERING SWINE PUMP
8 Claims, 3 Drawing Figs.

[52] U.S. Cl. .................................................... 119/75,
103/208
[51] Int. Cl. ..................................................... A01k
07/100
[50] Field of Search ........................................... 119/75, 76;
103/208

[56] References Cited
UNITED STATES PATENTS

| 33,243 | 9/1861 | Fraer | 103/208 |
| 805,617 | 11/1905 | Anderson | 103/208 |
| 1,856,582 | 5/1932 | Osse | 103/208 |

*Primary Examiner*—Hugh R. Chamblee
*Attorney*—John C. Barnes

ABSTRACT: A well pump and trough constructed and arranged with an operator connected to a lift pump which can be engaged directly by the animals to lift the pump and raise water to the trough.

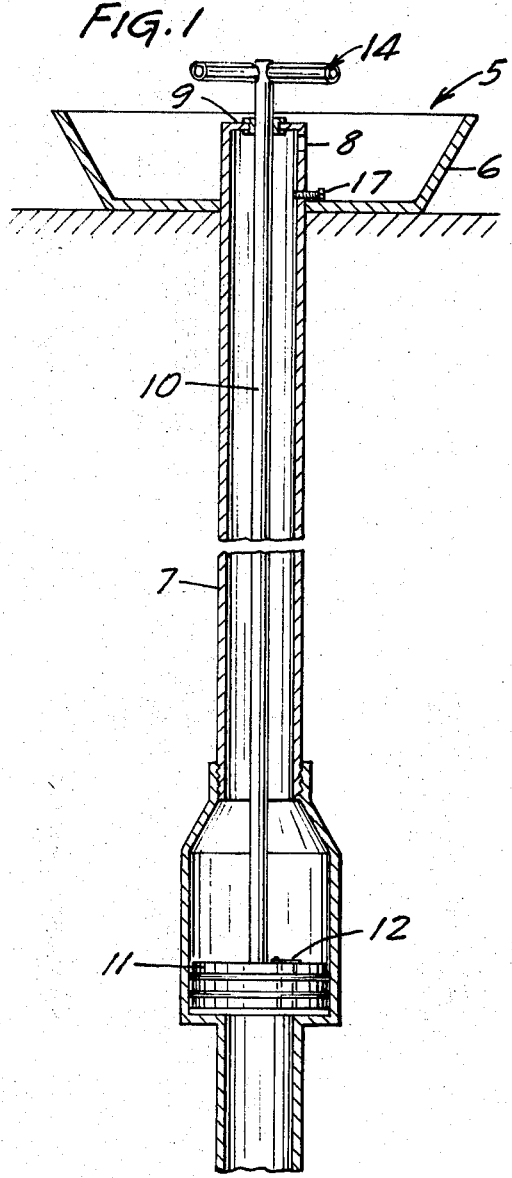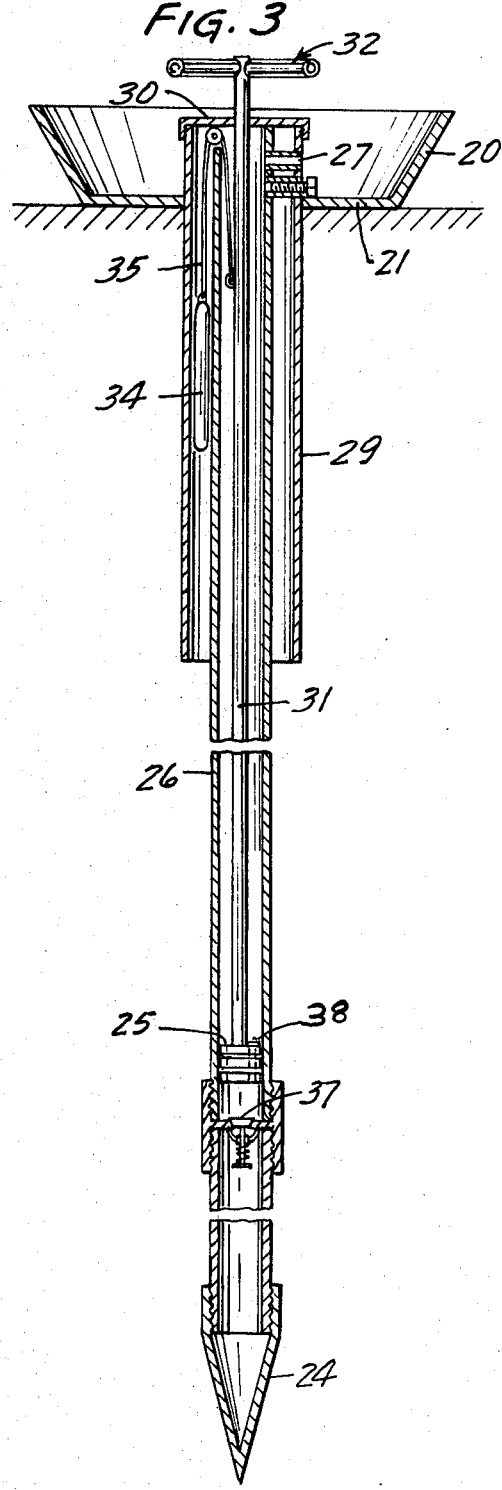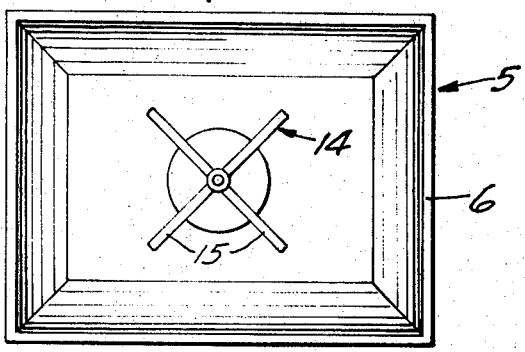
INVENTOR.
REUBEN PETERSON
BY
John C. Barnes
ATTORNEY

SELF-WATERING SWINE PUMP

This invention relates to an animal self-watering device, and in one aspect to a watering system for swine affording the hogs and pigs a drink upon their operation of a simple mechanical pump mechanism designed for operation by the animals.

Pumps for wells to produce water at animal troughs are well known and watering systems permitting water to be taken from reservoirs and placed in a trough upon demand by an animal are common. Characteristic of these prior known devices is the fact that they are operated by a mechanism not operated by the animal itself or the only mechanism to be operated by the animal is a valve as illustrated in U.S. Letters Pat. Nos. 443,228, issued Dec. 23, 1890, and 3,195,511, issued Jul. 20, 1965.

The waterer of the present invention comprises a trough secured at the end of a length of pipe leading to the well or other source of water underground, a cylinder communicates with the other end of the pipe and with another length of pipe reaching the water supply. A lift pump is disposed in said cylinder and is connected to a rod extending beyond the end of the pipe secured to the trough. A cruciform operating member is connected to the extended end of said rod. This cruciform member has a resilient outer surface and is disposed above the bottom permitting the animal to place its nose beneath a bar thereof to raise and lower the rod and reciprocate the lift pump to lift water in the pipe causing it to discharge from the pipe and flow into the trough. The normal rooting instinct of the hog will cause it to engage one leg of the cruciform member and lift it to operate the pump. The instinct of the hogs and pigs to root for food and water for themselves or shoats is the most reasonable explanation of the success of this invention or discovery of this application.

The present invention comprises a trough, a pipe extending toward the well and connected at its upper end to said trough and formed with a discharge in the side wall thereof permitting water to flow into said trough. Means support a rod in the pipe which rod is connected at one end to a lift pump and extends above the upper end of the pipe connected to the trough. An operating member of cruciform design and engageable by swine is connected to the rod to lift the rod and pump to lift water in said pipe to discharge in the trough.

The advantages and improvements of the present invention will become more apparent after reading the following description referring to the accompanying drawing wherein:

FIG. 1 is a vertical sectional view of a waterer constructed according to the present invention;

FIG. 2 is a plan view of the waterer of FIG. 1; and

FIG. 3 is a vertical sectional view of a second embodiment of the waterer of FIG. 1.

Referring now to FIG. 1, the illustrated waterer 5 is constructed for watering hogs and pigs and comprises a shallow trough 6 which surrounds the upper end of a pipe 7 forming a casing for a shallow well. The pipe 7 is connected to the trough 6 and extends slightly above the bottom of the trough to place the discharge spout or opening 8 above the trough bottom adequately to place sufficient water in the trough to water the animals. The trough 6, although shallow, is large enough to supply the animals.

The extended end of the pipe 7 is capped by a plate 9 or other cover which is bored to slidably receive therethrough a rod 10 extending into pipe 7.

The lower end of the rod 10 is connected to a plunger 11, forming a lift pump. The plunger 11 comprises a laminate of plates and leathers as conventional in reciprocating suction and lift pumps. A one-way valve 12 is formed in the plunger 11.

At the top of the rod 10, above the plate 9, is secured an animal engageable lift member 14, preferably having a cruciform appearance and formed of covered crossed rods 15. The covering on the rods 15 may be rubber or other material which can be engaged by the snout of the pig without hurting the animal because of temperature or material. Scrap hose may be a suitable covering for the rods 15.

A pig can engage one of the rods and the natural rooting instinct quickly teaches the pig to lift the rods to pump his own water.

Suitable removable drain plugs are positioned in the pipe 7 as illustrated at 17 to permit the trough to be drained when desired. The drain plugs could also be in the bottom of the trough so the water is not drained back to the well. Priming can be accomplished also through the plugs 17.

Referring now to FIG. 3, the waterer is operated and constructed similar to that of FIGS. 1 and 2 but is constructed for use in deeper wells. In this construction the rod connecting the engageable member and plunger is connected to means helping to counterbalance the increased weight resulting from its increased length.

The trough 20, rectangular or circular, has its bottom 21 penetrated by the upper end of a well casing comprising a pipe 22, comprising one or more lengths of pipe to reach the water supply, with a sand point 24 on the end of the first section. A lift pump 25 provided with a one-way valve 38 is disposed in an upper length of pipe 26 leading to the trough 20. At the upper end of pipe 26 is a discharge spout 27 spaced above the bottom 21 of the trough.

A housing 29 surrounds the upper length 26 and both the housing 29 and pipe 26 are covered by a cap 30 through which a rod 31 is slidably bearinged, which rod connects a lifting cross 32 with the lift pump 25.

In this embodiment the rod 31 is connected to a weight 34 disposed within the housing 29 and outside the upper length of pipe 26 by a flexible smooth tension member 35 in the form of a rope, cord or cable, preferably rust resistant and free from taking a set. One suitable material may be polyethylene as used for marine applications. The member 35 may be threaded over a pulley or roller 26 journalled in pipe 26.

The weight 34 should weigh just less than the sum of the weight of the cross member 32, rod 31 and plunger 25. In no event should it weigh considerably more. The weight of the water over pump 25 is enough to be raised by the pig without also lifting the pump rod and plunger. If the counter weight were too heavy, force may first be required to lower the plunger 25 which is not a natural thing for the animals to do.

It is to be understood that the watering device of FIG. 1 could also have the plunger in the well pipe and that a sand point may be used to drive the casing. A check valve 37 could also be disposed in the pipe 26 or 11 below the plunger 25, 11, respectively, so the pump will maintain its prime.

Alternatively, the lift member 14 or 32 may have a ring extending about and join the ends of the rods 15 to have the shape of a wheel with spokes.

I claim:

1. A swine watering system comprising:
   a trough having a bottom wall and sides;
   a casing formed of a hollow pipe and extending from a position slightly above said bottom wall, through said bottom wall in a position to be toward the water table;
   a rod in said casing having opposite ends, one said end extending above and supported on the casing above the bottom wall and the other of said ends extending into said casing;
   a plunger provided with a one-way valve is connected to said other end of said rod and is slidably sealed and fitted to said casing for reciprocation in said casing to serve as a pump; and
   a lift member connected only to said one said end of said rod which is extending from and supported by said casing, said lift member being formed and positioned thereby to permit engagement by the snout of swine to drive the rod and plunger in said casing.

2. The swine watering system of claim 1 wherein said casing has an enlarged cylindrical portion in which said plunger is positioned at the other end of said rod.

3. The swine watering system of claim 1 wherein said lift member is formed of crossed rods.

4. The swine watering system of claim 3 wherein said rods have a thermal insulating and protective covering.

5. The swine watering system of claim 4 wherein said covering comprises hose material.

6. The swine watering system of claim 1 wherein a housing surrounds said casing adjacent said trough, and
means connected to said rod to counterbalance the weight thereof to aid in the lifting of the plunger by lifting force on said lift member.

7. The swine watering system of claim 5 wherein a housing surrounds said casing adjacent said trough, and means connected to said rod and disposed in said housing to counterbalance the weight of said rod and lift member to aid in reducing the lifting force necessary to operate said plunger to raise water in said casing.

8. The swine watering system of claim 7 wherein said means connected to said rod to counterbalance comprise:
a weight in said housing and movable therein in a direction parallel to said reciprocating movement of said rod;
a flexible cable connected to said rod and to said weight; and
a pulley journalled in said casing, above a discharge therefrom into said trough, to support said cable for free movement between said casing and said housing.